Feb. 6, 1923.
D. FERGUSON ET AL.
SHEARS GRINDER.
FILED JUNE 18, 1921.
1,444,598.
3 SHEETS—SHEET 3.
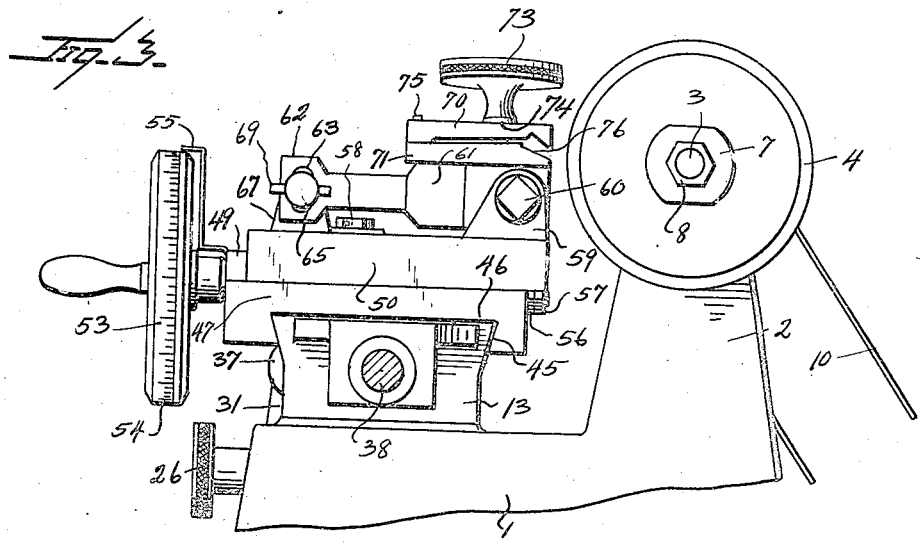
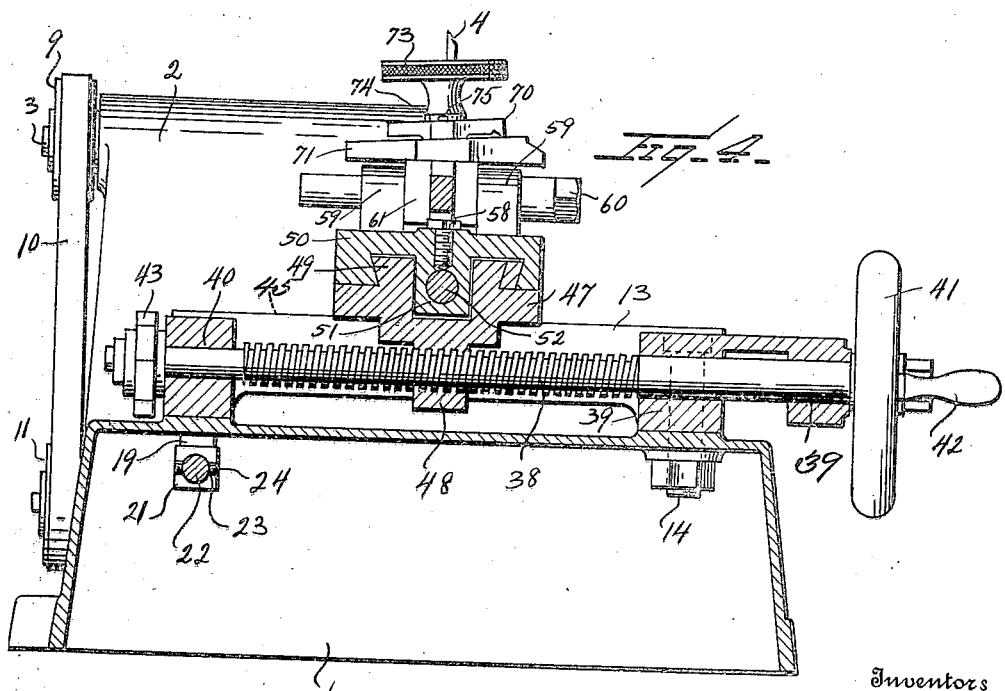
Inventors
D. Ferguson and
A. T. Scheiwer.
By Watson E. Coleman
Attorney Patented Feb. 6, 1923.

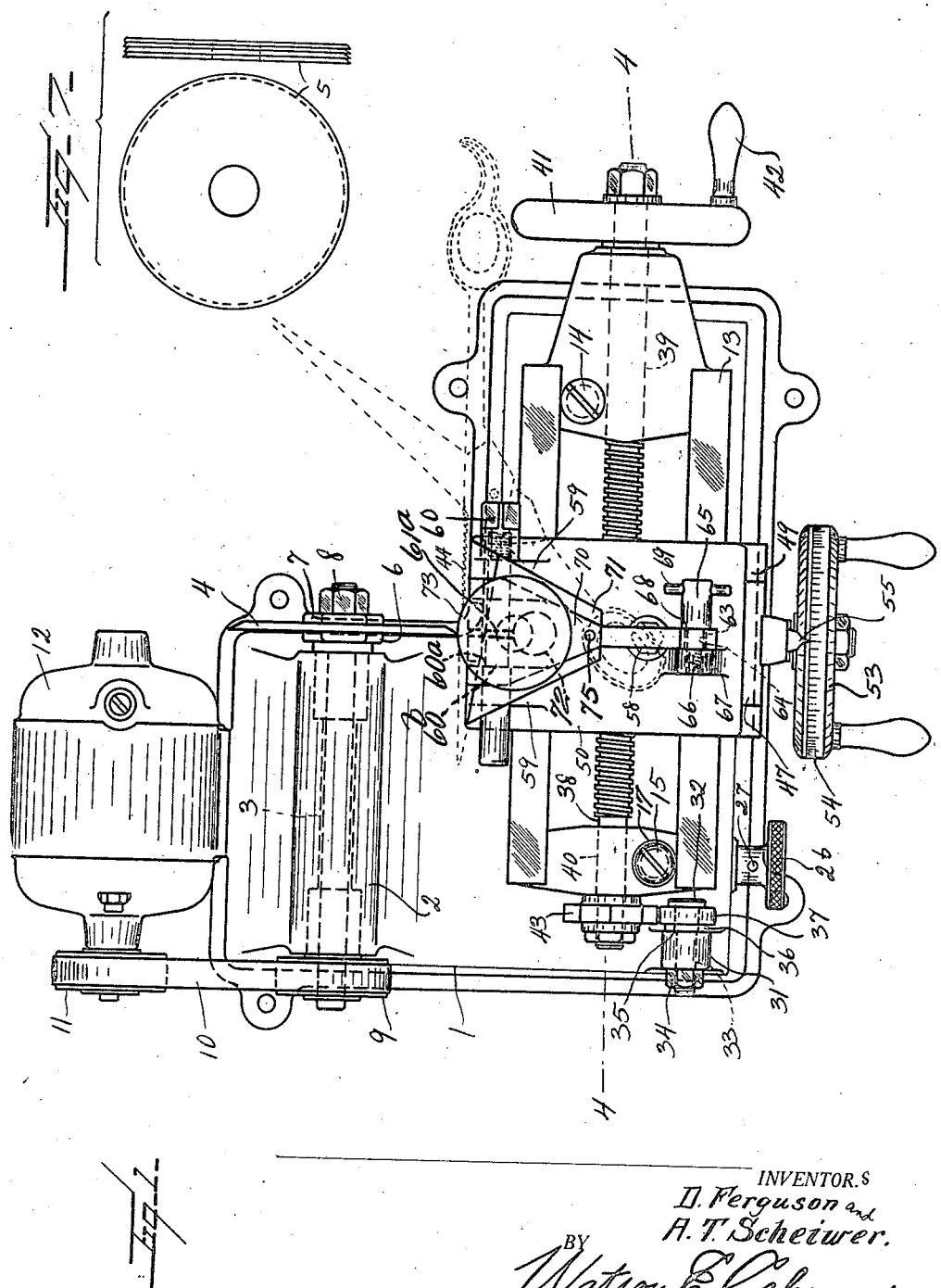

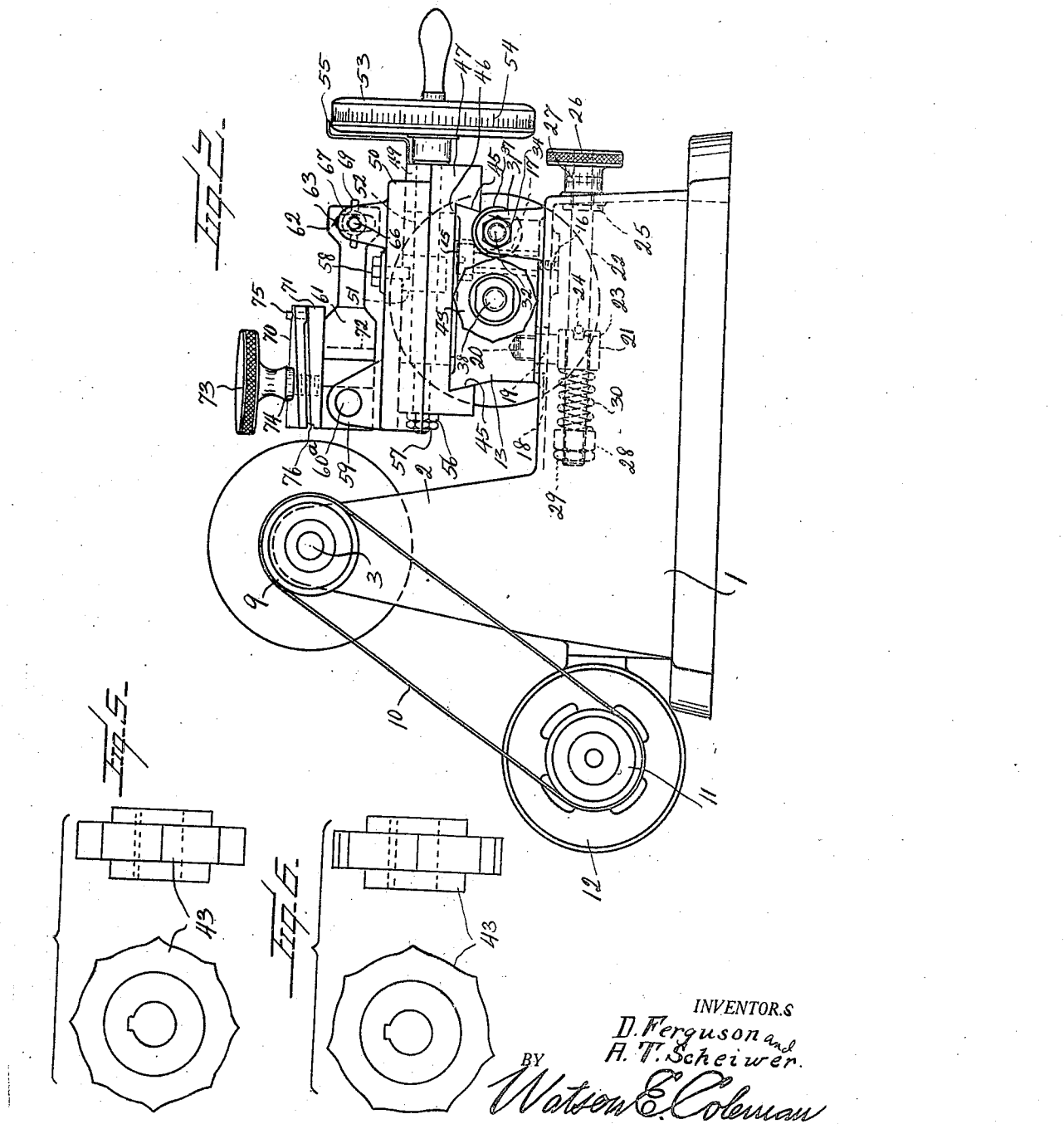

1,444,598

UNITED STATES PATENT OFFICE.

DAVID FERGUSON AND ALBERT T. SCHEIWER, OF ERIE, PENNSYLVANIA, ASSIGNORS TO ACCURATE TOOL WORKS, OF ERIE, PENNSYLVANIA, A FIRM COMPOSED OF JOSEPH J. SCHEIWER, DAVID FERGUSON, AND ALBERT T. SCHEIWER.

SHEARS GRINDER.

Application filed June 18, 1921. Serial No. 478,710.

*To all whom it may concern:*

Be it known that we, DAVID FERGUSON and ALBERT T. SCHEIWER, citizens of the United States, residing at Erie, in the county of Erie and State of Pennsylvania, have invented certain new and useful Improvements in Shears Grinders, of which the following is a specification, reference being had to the accompanying drawings.

It is the purpose of the present invention to provide a machine of this general character for the purpose of sharpening shear blades, and particularly for forming a serrated cutting edge on the blades of the shears, the purpose being to permit the shears to cut better and not allow the material it is cutting to move or slide ahead on the edges of the blades of the shears.

Another purpose is to provide a grinding machine of this character wherein the number of serrations per inch is governed by the action of a cam, which may be controlled by a screw or any other suitable means.

Still another purpose is the provision of a machine wherein a number of interchangeable cams is employed, so as to change the character of serrations. The cams can be changed at will in order to provide any number of divisions as may be required.

A further purpose is to provide a machine wherein a frame is swivelly supported at one end, with means for vibrating the other end, so that serrations may be formed along the cutting edges of the blades of a pair of shears, which are carried by the frame, and owing to the frame being vibrated on its swivel, the edge of the shear blade is vibrated toward and from the cutting or sharpening tool.

A still further purpose is the provision of means for oscillating the carriage or frame, which is swivelly supported, and means for moving the vibrating means out of operation, whereby the carriage may be held stationary, so that the shear blades may be provided with a plain edge.

It is also the purpose of the invention to improve, simplify and render more practical the machine described, illustrated, and claimed in the patent of David Ferguson and Albert T. Scheiwer, issued September 13, 1921, Number 1,390,726.

Additionally the invention aims to provide means for adjusting the angle of the shear blade, in order to regulate the angle of the serrated or plain cutting edge.

The invention comprises further features and combinations of parts, as will be hereinafter set forth, shown in the drawings and claimed.

In the drawings:—

Figure 1 is a plan view of the improved shear grinding machine constructed in accordance with the invention;

Figure 2 is a view in end elevation, showing the means for vibrating one end of a base, which supports a transversely movable carrier, so as to form a serrated cutting edge on shear blades;

Figure 3 is a view in elevation of the opposite end of the machine, more clearly showing the means for holding or clamping the shears;

Figure 4 is a longitudinal sectional view on line 4—4 of Figure 1, showing the swivelly supported base, and the longitudinally movable carriage;

Figure 5 discloses side and edge elevations of one form of cam, wherein it is provided with eight sides, for causing to be formed a certain character of serrations on the edges of the shear blades;

Figure 6 discloses side and edge elevations of another form of cam, wherein seven sides are employed, so as to cause another character of serration to be formed on the shear blades; and Figure 7 discloses side and edge elevations of an emery wheel, which may be trued up with a diamond held in the shear blade holder.

Referring to the drawings, 1 designates a supporting base, which may be any suitable shape, construction or configuration. Rising from the base is a standard 2, in a bearing of the upper end of which a shaft 3 is journaled. A suitable grinding tool, either as shown at 4 in Figure 1 or a tool 5 as in Figure 7 may be carried on one end of the shaft 3. The grinding tool is held between a shoulder 6 and a washer 7, by means of a nut 8. The grinding tool may be constructed of any suitable material, such as carborundum or emery, or may be constructed of hardened steel. The other end of the shaft 3 carries a suitable pulley 9, operatively connected by means of a belt 10 to a pulley 11 carried by the shaft of a conventional form of motor 12. By this arrangement power is transmitted to the shaft 3, for the purpose of imparting movement to the grinding tool.

An auxiliary base 13 is mounted upon the main base, and is swiveled or pivoted on a screw 14, which passes through the auxiliary base and is threaded into the main base at one end. Obviously the auxiliary base has slight pivotal movements, sufficient to move the shear blade toward and from the grinding tool. The auxiliary base is limited in its vibrating movements by a screw 15, which is threaded into the main base as at 16, so that its upper larger portion may engage through the auxiliary base at one end diagonally opposite the screw 14. The opening 17 of the auxiliary base and through which the screw 15 engages is large enough to provide clearance to permit the auxiliary base to oscillate on the screw 14.

The main base has an opening 18 adjacent to and opposite the opening 17 and engaging through the opening 18 is an abutment pin 19, the reduced threaded shank 20 of which is threaded into the auxiliary base 13, so that the abutment pin may move in the slot or opening 18. The lower end of the abutment pin has an abutment sleeve 21, through which the non-threaded portion of a screw 22 passes. The sleeve 21 is provided with diametrically opposite notches 23, to be engaged by a pin 24 extending transversely of the screw 22, which is rotatably mounted in the bearing 25 of the main base. A thumb nut 26 is secured upon the end of the screw 25 by means of a pin 27, whereby the screw 22 may be rotated. An abutment nut 28 is threaded upon the inner end of the screw 22, there being a lock nut 29 to hold the nut 28 in place. A coil spring 30 is interposed between the abutment sleeve 21 and the abutment nut, in order to tension the auxiliary base and hold the notches 23 in engagement with the transverse pin 24 of the screw 22.

Rising from the main base is a bearing 31, which carries a headed pin 32. The reduced portion 33 of the pin 32 engages through the bearing 31, and threaded thereon is a nut 34, to hold the headed pin 32 in position in the bearing 31, whereby the shoulder 35 is drawn tight against the bearing 31. A washer 36 is mounted upon the pin 33, and interposed between the washer and the head of the pin 32 is a cam roller 37.

A feed screw 38 is rotatably mounted in bearings 39 and 40 of the auxiliary base, and one end thereof has a hand wheel 41 (which is provided with a handle 42), while its other end is designed to carry any one of a plurality of cams 43, such as shown in Figures 5 and 6. These cams 43 may have any number of faces, either 5, 6, 7 or 8, possibly 9 or 10, in fact any number of faces. Each face, however, is designed to be shaped as shown clearly in Figures 5 and 6. The faces are designed to engage the cam roller 37, so that when a revoluble movement is imparted to the feed screw 38 by means of the hand wheel 41, the auxiliary base may be oscillated, so that the shear blade may be vibrated toward and from the grinding tool. By causing the auxiliary base to oscillate, a serrated cutting edge 44 may be formed on the cooperating edges of the blades of a pair of shears. Each of the cams is detachably connected to the end of the feed screw 38, so that the cams may be interchanged. The spring 30 is employed for keeping the cam 43 in contact with the cam roller 37, and it will be noted that the pin 24 cannot come out of the slot 23 when serrating the shear blade. When the pin is given a half turn it forces the abutment stud 19 against the main base 1, thus allowing the auxiliary base 13 and the carriage (which is movable thereon) to remain solid with the cam out of contact with the cam roller.

The auxiliary base is provided with guides 45, which are dovetailed in a channel 46 of the under face of a carriage 47, which is movable longitudinally of the auxiliary base, and in a plane transversely of the revoluble cutting tool. The carriage 47 has a depending lug 48, through which the feed screw 38 is threaded, so that by rotating the hand wheel 41, the carriage 47 may be moved longitudinally of the auxiliary base. The carriage 47 has a guide 49, which is dovetailed into the under face of an auxiliary carriage 50. The auxiliary carriage 50 is therefore movable in a plane at right angles to the movement of the carriage 47. Since the carriage 47 is movable in a plane at right angles to the revoluble cutter, and the carriage 50 is movable at right angles to the movement of the main carriage 47, it is obvious that the shear blades may be moved at right angles to the cutting edge of the revoluble cutter, and toward and from the edge of the cutter. Since the auxiliary base is capable of oscillatory movements, and owing to the right angle movements of the two carriages, the shear blades may be provided with serrated cutting edges. The auxiliary carriage 50 carries a depending bronze nut 51 through which the feed screw 52 is threaded. A hand wheel 53 is mounted on one end of the feed screw 52 and is provided with graduations for the purpose of indicating the adjustment of the carriage 50, there being an indicator 55 mounted on the main carriage 47 and designed to cooperating with the graduations for indicating the adjustment of the auxiliary carriage. The other end of the feed screw 52 has a holding nut 56 and a lock nut 57 to hold the screw swivelly in the carriage. The screw bolt 58 engages through the auxiliary carriage 50 and is threaded into the depending bronze nut to hold the nut connected to the carriage 50.

Rising from the auxiliary carriage 50 are spacing lugs 59, for the reception of the shaft or pin 60$^a$. A portion of this shaft is reduced, therefore one end of the shaft has a shoulder 60$^b$. A shear cutting angle adjuster 61 is pivotally mounted on the reduced portion of the shaft or pin 60$^a$, the shoulder 60$^b$ engaging one side of the angle adjuster, to limit the movement of the pin or shaft in one direction. It will be noted that the shear blade angle adjuster 61 is split as at 61$^a$, and is interposed between the two lugs 59, and in view of the fact that a nut 60 is threaded on the end of the reduced portion of the pin or shaft 60$^a$, the angle adjuster may be tightened on the shear blade holder. The angle adjuster 61 has an enlargement 62 at one end thereof, and this enlargement is provided with a slot 63, which receives the central portion 64 of the screw 65. The screw 65 is threaded at 66 in an upstanding ear 67 of the auxiliary carriage, so as to bind the shoulder 68 of the screw against the enlargement 62 of the angle adjuster, for the purpose of holding the same in other adjusted positions. One end of the screw 65 has a transverse pin 69, in order to provide means for rotating the screw. The angle adjuster carries a clamping device, which comprises the upper and lower jaws 70 and 71.

The lower jaw 71 has a shank 72, which is securely fitted in the body of the adjuster, while the jaw 70 is held in place on top of the jaw 71 by the clamping screw 73, the threaded shank of which engages through the jaw 71, and clamps the jaw 70 between the jaw 71 and the shoulder 74 of the clamping screw. As previously stated the angle adjuster is split, and since the shank 72 is fitted between the opposing parts of the split portion of the adjuster, the opposing parts may be tightened against the shank, by setting up the nut 60 on the threaded end of the shaft or pin 60$^a$. By setting up the nut the shoulder 60$^b$ binds against one of the parts of the adjuster, and draws it toward the opposite part, since said opposite part opposes one of the lugs 59. Obviously by loosening the nut 60 the shear blade holder may be adjusted, so as to line up the edge of the shear blade, for grinding the edge straight or parallel with the auxiliary base 13. The loosening of the nut 60 allows the shear blade holder to turn, in order to straighten the shear edge relatively to the grinding element or wheel. In fact the shank 72 together with the split adjuster constitute a turret connection, whereby the parts may be adjusted as found desirable. When the shear blade is set ready to grind the nut 60 is tightened, which draws the opposing parts of the split adjuster toward each other, allowing said parts to tighten around the shank 72. In order to hold the two jaws 70 and 71 in alignment, the jaw 71 has an upstanding pin 75, which passes through the jaw 70 and prevents turning of the jaws, when the clamping screw 73 is being tightened.

These jaws 70 and 71 in their corresponding edges are provided with opposite recesses 76, which are formed in cross section correspondingly to the cross sectional shape of the shear blades, as shown clearly in Figure 3. These opposite recesses are of such shape in cross section as to prevent lateral movement of the shear blade, when the blade is clamped in place, while the clamping action of the two jaws prevents longitudinal movement of the shear blade. Also in order to prevent longitudinal movement of the shear blade, these opposed recesses are tapered, as shown in the plan view of Figure 1.

In Figure 7 there is disclosed an emery wheel which has been trued up by means of a diamond (not shown) to be held in the shear blade holder. It will be noted that this emery wheel is provided with a plurality of V-shaped sharpening edges, so that a plurality of serrations may be formed in the shear blade edge at one time.

In the operation the shear blade is placed in the opposed recesses of the clamping jaws, then the screw 73 is tightened. The shear blade is thus arranged, when the main carriage 47 is in a position nearest the right hand end of the auxiliary base, so that the point or end of the shear blade approximates the margin or edge of the revoluble cutter. The hand wheel 53 is then rotated, which moves the auxiliary carriage in a direction toward the revoluble cutter, until the edge of the shear blade approximates the margin or edge of the cutter. Before the final adjustment of the auxiliary carriage, the operator makes sure that one of the faces of the cam is in contact with the cam roller 37, then the final adjustment of the carriage 50 is attained, by turning the hand wheel 53. The motor is then started, and movement is imparted to the cutter. Obviously as the cutter revolves, the hand wheel 41 may be rotated, not only feeding the main carriage, but also causing one of the projections between certain of the faces of the cam 43 to engage the cam roller, thereby forcing the shear blade edge toward the revoluble cutter, causing the revoluble cutter to form a serration. As soon as the feeding screw 38 is rotated, causing one of the projections between two of the cam faces to disengage the cam roller, the shear blade edge will not only move away from the margin or edge of the revoluble cutter, but also will be advanced in a direction transversely of the cutter, in a position whereby another serration may be formed. Instead of a single bevel revoluble cutter 4 as in Figure 1, a cutter similar to that shown in Figure 7 may be substituted, so that a plurality of serrations may be formed on the shear blade edge at the time of each advancement of the carriage.

It will be noted that by giving the screw 22 a half turn, the pin 24 may be disengaged from the diametrically opposite notches 23 of the abutment sleeve, causing the pin 24 to assume a position at right angles to the abutment sleeve, thereby moving the auxiliary base, so that the cam faces and the projections of the cam 43 will remain out of contact with the cam roller, thereby causing a plain cutting edge to be formed on the edge of the shear blade. It will be noted that by tilting the angle adjuster 61, the angle of the serration relatively to the plane of the shear blade may be regulated. It will be seen that the cutting edge on the shear blade will be true and perfect as regards the depth and the divisions per inch, and furthermore it will be noted that by the provision of the serrated edges the material which is to be cut is prevented from moving or sliding ahead between the cutting edges of the shear blades.

The graduations on the hand wheel 53 are for the purpose of indicating to the operator, the distance the carriage 50 (which contains the shear blade holder and the angle adjuster) is movable.

The serrations per inch are governed by the cam 43 and the screw 38. For instance, it is the aim in practice to have 10 threads per inch on the screw and together with a cam having 8 throws, a movement of one inch will require 10 turns or revolutions of the hand wheel 41, and since the cam is keyed on the screw, it will also turn 10 times, and as it has eight throws, it will cause the swiveled auxiliary base to move or vibrate in and out 80 times, and while the auxiliary base is so vibrating or moving toward and from the grinding element, the shear blade edge will be supplied with 80 serrations per inch. A 7 throw cam will give 70 serrations per inch, and so on accordingly to the number of throws the cam is capable of making. In fact any number of cams provided with 3, 4, 5, 6, 7, 8, 9, 10 or 11 throws, or more respectively may be supplied with this type of machine. The number of serrations per inch, to be formed on the shear by the use of this machine can be determined, by multiplying the number of throws on the cam used, by the number of threads per inch on the lead screw. The number of serrations or divisions per inch can be changed, by using cams of different throws, or screws with different number of threads per inch.

The invention having been set forth, what is claimed as being useful is:

1. In a machine for grinding serrated edges on shear blades, the combination with a base, of a revoluble cutter mounted thereon, an auxiliary base mounted to vibrate in a horizontal plane on the first base, an abutment roller on the first base, a feed screw rotatably mounted in the auxiliary base and provided with a cam at one end to cooperate with the abutment rollers to vibrate the auxiliary base, a carriage mounted for longitudinal movement on the auxiliary base and operatively connected with the feed screw and movable in a direction parallel with the axis of the cutter, a second carriage mounted on the first carriage to move in a direction transversely of the axis of the cutter, a work holder mounted on the second carriage, to support the work in cooperative engagement with the cutter, a screw rotatably adjustable in the first base, an abutment screw carried by the second base and depending therefrom and through which the first screw operatively engages, tensioning means on the first screw bearing against and urging pressure upon that portion of the second screw through which the first screw passes, whereby the cam is held in contact with the abutment roller.

2. In a machine for grinding serrated edges on shear blades, the combination with a base, of a revoluble cutter mounted thereon, an auxiliary base mounted to vibrate in a horizontal plane on the first base, abutment roller on the first base, a feed screw rotatably mounted in the auxiliary base and provided with a cam at one end to cooperate with the abutment roller to vibrate the auxiliary base, a carriage mounted for longitudinal movement on the auxiliary base and operatively connected with the feed screw and movable in a direction parallel with the axis of the cutter, a second carriage mounted on the first carriage to move in a direction transversely of the axis of the cutter, a work holder mounted on the second carriage, to support the work in cooperative engagement with the cutter, a screw rotatably adjustable in the first base, an abutment screw carried by the second base and depending therefrom and through which the first screw operatively engages, tensioning means on the first screw bearing against and urging pressure upon that portion of the second screw through which the first screw passes, whereby the cam is held in contact with the abutment roller, means carried by the first screw and operatively connected with that portion of the abutment screw, whereby the cam may be held in and out of cooperation with the abutment roller.

3. In a machine for grinding serrated edges on shear blades, the combination with a dominant base, of an auxiliary base mounted on the first base for lateral vibration, a carriage mounted on the auxiliary base for longitudinal movement in a direction parallel with the axis of a cutter, means for feeding said carriage, a second carriage mounted on the first carriage for movements in a direction transversely of the axis of the cutter, a cutter mounted on the base, means mounted on the second carriage for supporting work in a position for cooperation with the cutting edge of the cutter, means operatively connected with the feeding means for causing vibrations of the auxiliary base, a screw mounted in the dominant base, an abutment screw carried by the auxiliary base and terminating at its lower end in a sleeve, through which the first screw axially and loosely engages, tensioned means on the first screw bearing upon the sleeve and acting to hold the parts of the vibrating means in cooperation, and means carried by the first screw to cooperate with the sleeve to hold the cooperating parts of the vibrating means in or out of cooperation.

4. In a machine for grinding serrated edges on shear blades, the combination with a dominant base, of a cutter mounted thereon, an auxiliary base mounted to vibrate in a direction transversely of the axis of the cutter, a carriage mounted upon the auxiliary base for longitudinal movement and in a direction parallel with the axis of the cutter, feeding means for moving the carriage, means operatively connected with the feeding means for causing the auxiliary base to vibrate, a screw swivelly mounted in the dominant base and having an abutment at its inner end, a screw depending from the auxiliary base and provided with a sleeve through which the first screw engages, and spring means mounted on the first screw between its abutment and the sleeve for retaining the vibrating means in cooperation with said feeding means, said sleeve having diametrically opposite notches, and means carried by the first screw cooperating with said notches to prevent the first screw from rotating, and yet permitting the auxiliary base to vibrate, the construction and arrangement of the notches and the means carried by the first screw being such that said means of the first screw may be disengaged from the notches when the first screw is rotated, to hold parts of the vibrating means out of cooperation, and a work holder mounted upon the second carriage for holding the work adjacent the cutting edge of the cutter.

5. In a machine for grinding serrated edges on shear blades, the combination with a base, of a cutter mounted thereon, a carriage mounted for movement in a direction transversely of the axis of the cutter, an angle adjuster mounted upon the carriage comprising a body pivoted on the carriage at a point adjacent the cutter, a pair of work holding clamps on the body of the angle adjuster, means on the carriage and operatively connected with one end of the body of the angle adjuster, for tilting the work toward and from the cutting edge of the cutter.

6. In a machine for grinding serrated edges on shear blades, the combination with a base, of a cutter revoluble thereon, a carriage mounted for movement in a direction transversely to the axis of the cutter, an angle adjuster for the work, said angle adjuster comprising a body pivoted on the carriage adjacent the cutting edge of the cutter, a support on the carriage, one end of the body of the angle adjuster having an elongated slot, means engaging through said slot and operatively connected to the support for holding the body of the angle adjuster in different tilted positions, whereby the work may be tilted toward and from the cutting edge of the cutter, work holding clamps adjustably and operatively mounted upon the body of the angle adjuster, for holding the work adjacent the cutting edge of the cutter.

7. In a machine for grinding serrated edges on shear blades, a base including a cutter mounted thereon, an auxiliary base mounted for pivotal movement, whereby one end thereof may move in a horizontal direction toward and from the cutter, a carriage mounted upon the auxiliary base for movement in a direction parallel with the axis of the cutter, feeding means for said carriage, an abutment roller on the main base, a polygonal cam carried by the feeding means and provided with a plurality of faces cooperative with the abutment roller for vibrating the auxiliary base, and tensioning means operatively connected with the auxiliary base for retaining the cam in contact with the abutment roller.

8. In a machine for grinding serrated edges on shear blades, a dominant base including a cutter mounted thereon and provided with an abutment roller, an auxiliary base mounted upon the dominant base for oscillatory movement in a direction horizontally toward and from the cutter, a carriage including work holding means operatively mounted upon the auxiliary base, feeding means for moving the carriage in a direction parallel with the axis of the cutter, a cam carried by the feeding means and cooperable with the abutment roller, an abutment stud carried by the auxiliary base, an adjusting screw carried by the base and being operable through the abutment stud, an abutment member carried by the end of the screw, tensioning means between the abutment member and the abutment stud, acting to retain the cam in constant contact with the abutment roller, whereby the auxiliary base may vibrate horizontally.

9. In a machine for grinding serrated edges on shear blades, a dominant base including a cutter mounted thereon and provided with an abutment roller, an auxiliary base mounted upon the dominant base for oscillatory movement in a direction horizontally toward and from the cutter, a carriage including work holding means operatively mounted upon the auxiliary base, feeding means for moving the carriage in a direction parallel with the axis of the cutter, a cam carried by the feeding means and cooperable with the abutment roller, an abutment stud carried by the auxiliary base, an adjusting screw carried by the base and being operable through the abutment stud, an abutment member carried by the end of the screw, tensioning means between the abutment member and the abutment stud, acting to retain the cam in constant contact with the abutment roller, whereby the auxiliary base may vibrate horizontally, means carried by the screw and operatively connecting with the abutment stud when the screw is rotated, to keep the cam out of contact with the abutment roller.

10. In a machine for grinding serrated edges on shear blades, a base including a cutter thereon, an angle adjuster pivoted for tilting movement in a direction at right angles to the axis of the cutter, means on the dominant base for operatively supporting said angle adjuster and including a support, said angle adjuster comprising a body, having a vertical slot at one end thereof, means adjustably mounted on the support and passing through the slot for holding the body of the adjuster in different tilted positions, work holding clamps removably mounted on the body of the adjuster and being separably connected, for holding the work at right angles to the cutting edge of the cutter.

In testimony whereof we hereunto affix our signatures.

DAVID FERGUSON.
ALBERT T. SCHEIWER.